US012627638B2

(12) United States Patent
Venkataraman et al.

(10) Patent No.: US 12,627,638 B2
(45) Date of Patent: May 12, 2026

(54) STORAGE DEVICE, STORAGE SYSTEM, AND METHOD OF SECURE DATA MOVEMENT BETWEEN STORAGE DEVICES

(71) Applicant: Samsung Electronics Co., Ltd., Suwon-si (KR)

(72) Inventors: Gayathiri Venkataraman, Santa Clara, CA (US); Matthew Shaun Bryson, Los Gatos, CA (US); Vishwanath Maram, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 413 days.

(21) Appl. No.: 17/233,145

(22) Filed: Apr. 16, 2021

(65) Prior Publication Data

US 2022/0278963 A1 Sep. 1, 2022

Related U.S. Application Data

(60) Provisional application No. 63/155,185, filed on Mar. 1, 2021.

(51) Int. Cl.
  *H04L 9/40* (2022.01)
  *G06F 3/06* (2006.01)
    (Continued)

(52) U.S. Cl.
  CPC ........ *H04L 63/0428* (2013.01); *G06F 3/0604* (2013.01); *G06F 3/0659* (2013.01);
    (Continued)

(58) Field of Classification Search
  CPC ... G06F 21/79; H04L 63/166; H04L 63/0428; H04L 63/061; H04L 63/062; H04L 63/06;
    (Continued)

(56) References Cited

U.S. PATENT DOCUMENTS

| | | | |
|---|---|---|---|
| 6,164,547 | A | 12/2000 | Vapaakoski et al. |
| 7,240,219 | B2 | 7/2007 | Teicher et al. |

(Continued)

FOREIGN PATENT DOCUMENTS

| | | | | |
|---|---|---|---|---|
| EP | 2334005 | A1 | 6/2011 | |
| JP | 2006091952 | A * | 4/2006 | .......... G06F 21/805 |

(Continued)

OTHER PUBLICATIONS

EPO Extended European Search Report dated Oct. 27, 2021, issued in corresponding European Patent Application No. 21176534.2 (8 pages).

(Continued)

*Primary Examiner* — Tae K Kim

(74) *Attorney, Agent, or Firm* — Lewis Roca Rothgerber Christie LLP

(57) ABSTRACT

A storage device includes: a storage memory component to store requested data in encrypted format; and a storage controller connected to the storage memory component over a storage interface, the storage controller to: receive a command and a decryption override indicator from a host device over a host interface to read the requested data from the storage memory component; retrieve the requested data from the storage memory component in the encrypted format in response to the command; and transmit the requested data in the encrypted format to a destination storage device over a transport layer in response to the decryption override indicator.

19 Claims, 5 Drawing Sheets

(51) Int. Cl.
    *G06F 21/79*          (2013.01)
    *H04L 9/08*           (2006.01)

(52) U.S. Cl.
    CPC ............ *G06F 3/0679* (2013.01); *G06F 21/79*
        (2013.01); *H04L 9/0825* (2013.01); *H04L*
        *9/0827* (2013.01); *H04L 63/166* (2013.01)

(58) Field of Classification Search
    CPC ... H04L 63/105; H04L 63/10; H04L 63/0435;
        H04L 9/088; H04L 9/0894; H04L 9/0897;
        H04L 9/0827; H04L 9/0819; H04L 9/083;
        H04L 9/08; H04L 9/12; H04L 3/0604;
        H04L 3/0659; H04L 3/0679; H04L 21/79;
        H04L 9/0825
    See application file for complete search history.

(56)            References Cited

U.S. PATENT DOCUMENTS

| | | | |
|---|---|---|---|
| 8,660,266 | B2 | 2/2014 | Sutton, II et al. |
| 9,069,703 | B2 | 6/2015 | Raam |
| 9,292,699 | B1 * | 3/2016 | Stuntebeck ......... G06F 21/6218 |
| 9,331,989 | B2 | 5/2016 | Dover |
| 10,037,436 | B2 * | 7/2018 | White ................... H04L 9/0822 |
| 10,055,568 | B1 | 8/2018 | Biesecker et al. |
| 10,171,235 | B2 | 1/2019 | Boehl et al. |
| 11,163,701 | B2 * | 11/2021 | Chhabra ................. G06F 21/52 |
| 11,250,142 | B1 * | 2/2022 | Wu ....................... H04L 9/0819 |
| 11,575,672 | B2 * | 2/2023 | Yitbarek ............... H04L 9/3247 |
| 2013/0198521 | A1 * | 8/2013 | Wu ....................... H04L 9/3263 |
| | | | 713/175 |
| 2015/0318986 | A1 | 11/2015 | Novak et al. |
| 2016/0357972 | A1 * | 12/2016 | Stuntebeck ............. G06F 16/16 |
| 2017/0017810 | A1 * | 1/2017 | Bolotin ................ H04L 63/083 |
| 2017/0169250 | A1 * | 6/2017 | White ....................... H04L 9/14 |
| 2018/0041483 | A1 * | 2/2018 | Smith ..................... H04L 63/08 |
| 2018/0159684 | A1 * | 6/2018 | Roth ..................... H04L 9/0897 |
| 2018/0329647 | A1 * | 11/2018 | Dai ........................ G06F 3/0647 |
| 2019/0042474 | A1 * | 2/2019 | Edirisooriya ......... G06F 3/0634 |
| 2019/0087354 | A1 * | 3/2019 | Chhabra ............... H04L 9/0637 |
| 2019/0227827 | A1 * | 7/2019 | Zmudzinski ............ G06F 21/57 |
| 2019/0243779 | A1 * | 8/2019 | Li ........................ G06F 12/0246 |
| 2019/0340251 | A1 * | 11/2019 | Peddada ................... H04L 9/16 |
| 2020/0012527 | A1 * | 1/2020 | Hartsock ................... H04L 9/14 |
| 2020/0136822 | A1 * | 4/2020 | Villapakkam ......... H04L 9/0894 |
| 2020/0145419 | A1 * | 5/2020 | Yitbarek ............. H04L 63/0853 |
| 2020/0152235 | A1 | 5/2020 | Frank et al. |
| 2020/0186342 | A1 | 6/2020 | Zhang et al. |
| 2020/0193017 | A1 * | 6/2020 | Bannister .............. G06F 21/554 |
| 2020/0210070 | A1 * | 7/2020 | Durham .............. G06F 12/1425 |
| 2020/0396054 | A1 * | 12/2020 | Wu ........................ G06F 3/0659 |
| 2021/0004355 | A1 * | 1/2021 | Iwase ................... G06F 16/152 |
| 2021/0014048 | A1 * | 1/2021 | Lee ....................... H04L 9/0825 |
| 2021/0150038 | A1 * | 5/2021 | Valecha ................ H04L 9/3268 |
| 2022/0207191 | A1 * | 6/2022 | Hetzler ................. G06F 21/602 |

FOREIGN PATENT DOCUMENTS

| | | | |
|---|---|---|---|
| KR | 10-2005-0046103 A | 5/2005 | |
| KR | 10-2018-0015073 A | 2/2018 | |
| TW | 202029042 A | 8/2020 | |
| WO | WO-2017123433 A1 * | 7/2017 | ......... H04L 63/0492 |

OTHER PUBLICATIONS

Korean Office Action dated Mar. 28, 2022, issued in corresponding Korean Patent Application No. 10-2021-0059183 (8 pages).
EPO Office Action dated Feb. 21, 2024, issued in corresponding European Patent Application No. 21176534.2 (6 pages).

* cited by examiner

STORAGE DEVICE, STORAGE SYSTEM, AND METHOD OF SECURE DATA MOVEMENT BETWEEN STORAGE DEVICES

CROSS-REFERENCE TO RELATED APPLICATION(S)

This application claims priority to and the benefit of U.S. Provisional Application No. 63/155,185, filed on Mar. 1, 2021, entitled "SECURE DATA MOVEMENT BETWEEN NVME SSDS," the entire content of which is incorporated by reference herein.

FIELD

Aspects of one or more embodiments of the present disclosure relate to a storage device, and more particularly, to a storage device to securely transmit data, a storage system including the same, and a method of securely transmitting data between storage devices.

BACKGROUND

Generally, various stages of digital data include data at rest, data in use, and data in transit. From among these stages, data at rest may include data that is housed physically on a storage device, for example, such as on a solid-state drive (SSD), a hard-disk drive (HDDs), and the like, in any suitable digital form, and may include both structured and unstructured data. Unlike data in use or data in transit, data at rest may generally refer to data that is stored in persistent storage, while data in use and data in transit may refer to data that is being processed or temporarily stored in volatile memory, for example, such as random access memory (RAM). To prevent unauthorized access to such data at rest, various security measures may be employed, for example, such as password protection, data encryption, or a combination thereof.

While these security measures may generally be effective against unauthorized access while the data is physically stored in the storage device, when transmitting such data at rest from one storage device to another, for example, such as during a virtual machine migration, a volume snapshot, a backup of the data, an archive of the data, and the like, the data may be transmitted in an unsecure format, for example, such as in plain text. For example, the data may be physically stored in encrypted format at a source storage device, may be decrypted by the source storage device to be transmitted to a destination storage device in a decrypted format (e.g., in plain text), may be transmitted to the destination storage device in the decrypted format, and may be re-encrypted by the destination storage device prior to being physically stored in encrypted format in the destination storage device. Thus, such data at rest may be vulnerable to unauthorized access or attacks while being transferred, moved, or copied between storage devices.

The above information disclosed in this Background section is for enhancement of understanding of the background of the present disclosure, and therefore, it may contain information that does not constitute prior art.

SUMMARY

One or more embodiments of the present disclosure are directed to a storage device to securely transmit data, a storage system including the same, and a method of securely transmitting data between storage devices.

According to one or more embodiments of the present disclosure, a storage device includes: a storage memory component configured to store requested data in encrypted format; and a storage controller connected to the storage memory component over a storage interface, the storage controller configured to: receive a command and a decryption override indicator from a host device over a host interface to read the requested data from the storage memory component; retrieve the requested data from the storage memory component in the encrypted format in response to the command; and transmit the requested data in the encrypted format to a destination storage device over a transport layer in response to the decryption override indicator.

In an embodiment, the transport layer may include at least the host device, and to transmit the requested data in the encrypted format to the destination storage device, the storage controller may be configured to transmit the requested data in the encrypted format to the destination storage device through at least the host device.

In an embodiment, the transport layer may further include a destination host device, and to transmit the requested data in the encrypted format to the destination storage device, the storage controller may be configured to transmit the requested data in the encrypted format to the destination storage device through at least the host device and the destination host device.

In an embodiment, the transport layer may include a secure communications channel between the storage device and the destination storage device, and to transmit the requested data in the encrypted format to the destination storage device, the storage controller may be configured to transmit the requested data in the encrypted format to the destination storage device through the secure communications channel.

In an embodiment, the storage controller may be further configured to transfer a key associated with the requested data to the destination storage device for decrypting the requested data.

In an embodiment, to transfer the key, the storage device may be configured to transfer an ownership of the key or information indicative of the ownership of the key.

In an embodiment, to transfer the key, the storage device may be configured to retain a private key associated with the requested data, and to transfer a public key associated with the requested data.

In an embodiment, to transfer the key, the storage device may be configured to transfer the key to a key server communicably connected to the host device.

In an embodiment, the storage controller may be configured to transfer the key in response to a request for the key.

In an embodiment, the storage device may include a solid state drive, the storage memory component may include flash memory, and the storage interface may include a flash interface layer of the storage device.

According to one or more embodiments of the present disclosure, a storage system includes: a first storage device configured to store requested data in encrypted format, and to transmit the requested data in the encrypted format over a transport layer; and a second storage device connected to the first storage device through the transport layer, the second storage device being configured to receive the requested data in the encrypted format over the transport layer, and to store the requested data in the encrypted format.

In an embodiment, the first storage device may include: a first storage memory component configured to store the requested data in the encrypted format; and a first storage controller connected to the first storage memory component over a first storage interface, the first storage controller configured to: receive a first command and a decryption override indicator to read the requested data from the first storage memory component; retrieve the requested data from the first storage memory component in the encrypted format in response to the first command; and transmit the requested data in the encrypted format to the second storage device over the transport layer in response to the decryption override indicator.

In an embodiment, the first storage controller may be further configured to transfer a key associated with the requested data to the second storage device for decrypting the requested data.

In an embodiment, to transfer the key, the first storage device may be configured to transfer an ownership of the key or information indicative of the ownership of the key.

In an embodiment, to transfer the key, the first storage device may be configured to retain a private key associated with the requested data, and to transfer a public key associated with the requested data.

In an embodiment, the storage system may further include a key server communicably connected to the first and second storage devices, and to transfer the key, the first storage device may be configured to transfer the key to the key server.

In an embodiment, the second storage device may include: a second storage memory component; and a second storage controller connected to the second storage memory component over a second storage interface, the second storage controller configured to: receive a second command and an encryption override indicator to write the requested data in the encrypted format to the second storage memory component; skip encryption of the requested data in response to the encryption override indicator; and store the requested data in the encrypted format in the second storage memory component.

In an embodiment, the second storage device may be further configured to: receive a third command to read the requested data from the second storage memory component; retrieve the requested data in the encrypted format from the second storage memory component; retrieve the key; and decrypt the requested data according to the key.

In an embodiment, at least one of the first storage device or the second storage device may include a solid state drive; at least one of the first storage memory component or the second storage memory component may include flash memory; and at least one of the first storage interface or the second storage interface may include a flash interface layer.

According to one or more embodiments of the present disclosure, a method of securely transmitting data between storage devices, includes: reading requested data in encrypted format at a first storage device; transmitting the requested data in the encrypted format from the first storage device to a second storage device over a transport layer; writing the requested data in the encrypted format at the second storage device by skipping encryption of the requested data; transferring a key associated with the requested data for decrypting the requested data to the second storage device; reading the requested data at the second storage device; retrieving the key associated with the requested data; and decrypting the requested data using the key at the second storage device.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Figure 1:
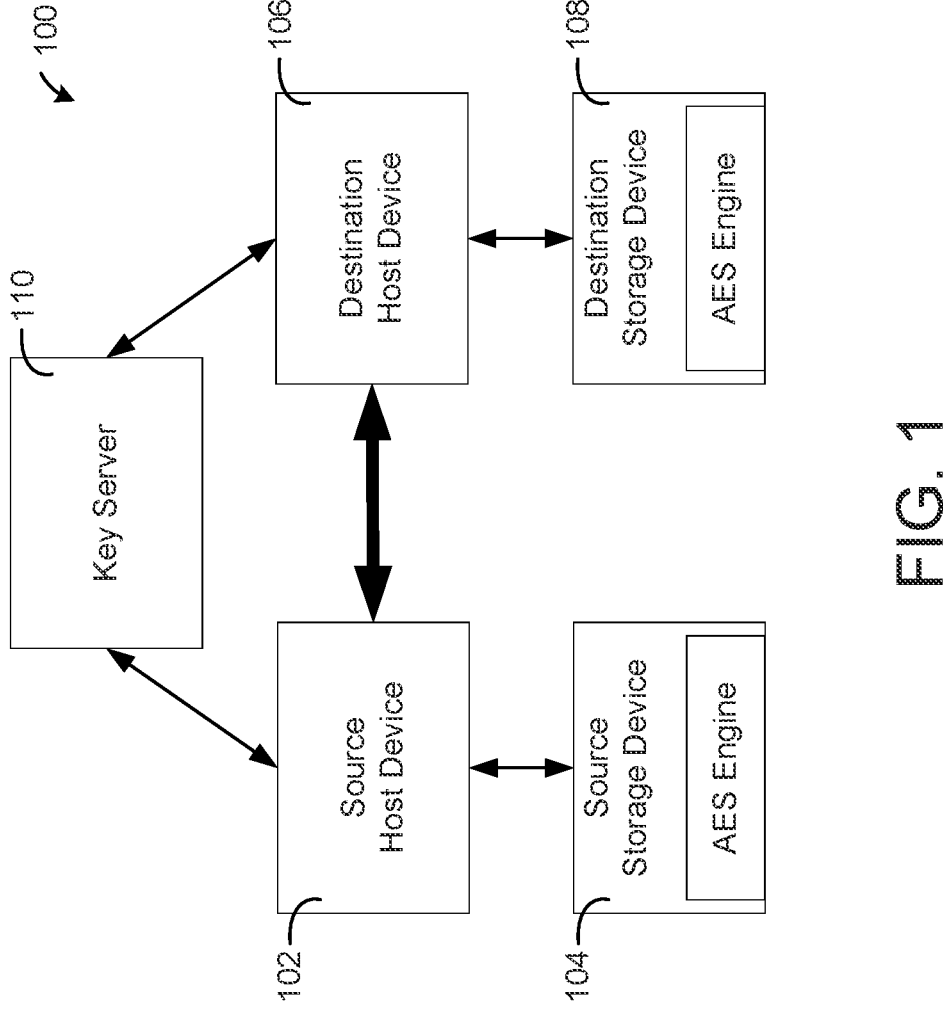
FIG. 1 illustrates a storage system, according to one or more embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, description thereof may not be repeated.

Generally, when transmitting data at rest from a source storage device to a destination storage device, the data may be transmitted in an unsecure format, for example, such as in plain text. For example, in response to a read command for requested data from a source host device, the source storage device may first decrypt the requested data (which may be stored on the source storage device in an encrypted format) prior to transmitting the decrypted data to the source host device. The source host device may then transmit the decrypted data in the received format (e.g., in plain text) to a destination host device for storing in a destination storage device. Accordingly, during the transmission, the decrypted data (e.g., the plain text data) may be vulnerable to unauthorized access and/or attacks.

Further, when the destination host device receives the decrypted data from the source host device, the destination host device may transmit a write command for the requested data to the destination storage device. In response to the write command, the destination storage device may first encrypt the decrypted data to generate and store the received decrypted data as encrypted data. Accordingly, the requested data, which is stored in encrypted format at the source storage device, may first be decrypted by the source storage device, and then may be re-encrypted by the destination storage device prior to being stored in the destination storage device. As a result, the requested data may be unnecessarily encrypted and/or decrypted by the source and destination storage devices, and thus, latency and power consumption may be increased and/or throughput may be decreased.

According to one or more embodiments of the present disclosure, when transmitting requested data between a source storage device and a destination storage device, the requested data may be read from the source storage device in the encrypted format, and may be transmitted to the destination storage device as-is in the encrypted format, without first decrypting the requested data. Accordingly, the requested data may be relatively secure during the transmitting between the storage devices.

Further, according to one or more embodiments of the present disclosure, the destination storage device may store the requested data in the received encrypted format as-is without first having to re-encrypt the requested data. In this case, a key used for encrypting/decrypting the requested data may be transferred from the source storage device to the destination storage device, such that the destination storage device may use the key to decrypt the requested data as needed or desired. Accordingly, the storage devices may not unnecessarily encrypt/decrypt the requested data, and thus, throughput may be increased and/or latency and power consumption may be decreased.

FIG. 1 illustrates a storage system, according to one or more embodiments of the present disclosure. As an example, FIG. 1 shows a storage system 100 for migrating data in which data is transferred, moved, or copied from a source storage device (e.g., a first storage device) 104 to a destination storage device (e.g., a second storage device) 108. While FIG. 1 shows that the source storage device 104 and the destination storage device 108 are connected to different host devices 102 and 106, the present disclosure is not limited thereto, and the source storage device 104 and the destination storage device 108 may be connected to the same host device (e.g., 102 or 106).

Referring to FIG. 1, the storage system 100 may include a source host device (e.g., a first host device) 102, the source storage device (e.g., the first storage device) 104, a destination host device (e.g., a second host device) 106, and the destination storage device (e.g., the second storage device) 108. The source host device 102 and the destination host device 106 may be communicably connected to each other to exchanged data with each other. For example, the source host device 102 and the destination host device 106 may be connected to each other through various suitable wired or wireless communications interfaces (e.g., jacks, antennas, transmitters, receivers, transceivers, wire terminals, and/or the like) for conducting data communications with each other. In various embodiments, the communications may be be direct (e.g., local wired or wireless communications) or via a communications network (e.g., a WAN, the Internet, a cellular network, and/or the like). For example, each of the source host device 102 and the destination host device 106 may include an Ethernet card and port for sending and receiving data via an Ethernet-based communications link or network. In another example, each of the source host device 102 and the destination host device 106 may include a Wi-Fi transceiver for communicating via a wireless communications network. In another example, one or both of the source host device 102 and the destination host device 106 may include cellular or mobile phone communications transceivers.

Each of the source storage device 104 and the destination storage device 108 may include an encryption/decryption element, for example, such as an advanced encryption standard (AES) engine, to encrypt and decrypt the data stored therein using any suitable encryption/decryption algorithm. Accordingly, each of the source and destination storage devices 104 and 108 may encrypt and store encrypted data therein, and may decrypt and transmit decrypted data from the stored encrypted data. The source storage device 104 and the destination storage device 108 may use the same encryption/decryption algorithm as each other, or may use different encryption/decryption algorithms from each other. However, the present disclosure is not limited thereto, and in some embodiments, the source storage device 104 may include at least an encryption element to encrypt data stored therein, and the destination storage device 108 may include at least a decryption element to decrypt data stored therein as needed or desired.

In some embodiments, during the data migration, the source host device 102 may transmit a READ request for requested data to the source storage device 104 with an option to not decrypt the requested data. For example, the source host device 102 may transmit a READ command for the requested data to the source storage device 102 along with an indicator (e.g., a bit, a flag, a signal, a plug-in, a separate command, and/or the like) to override (e.g., to skip) a decryption of the requested data. In various embodiments, the indicator may be part of the READ command, for example, as a modified READ command, may be received at a dedicated port or channel of the source storage device 104 to indicate the decryption override, may be received as a separate command or signal from the READ command, and/or the like, so long as the source storage device 104 may distinguish the decryption override indicator from other READ commands (e.g., a READ and decrypt command). The requested data may include the whole disk (e.g., the entire data stored in the source storage device 104), or a part of the disk (e.g., any suitable user-defined abstraction, for example, such as a file, an object, a container, a namespace, a volume, a virtual machine disk, and/or the like stored in the source storage device 104).

Figure 2:
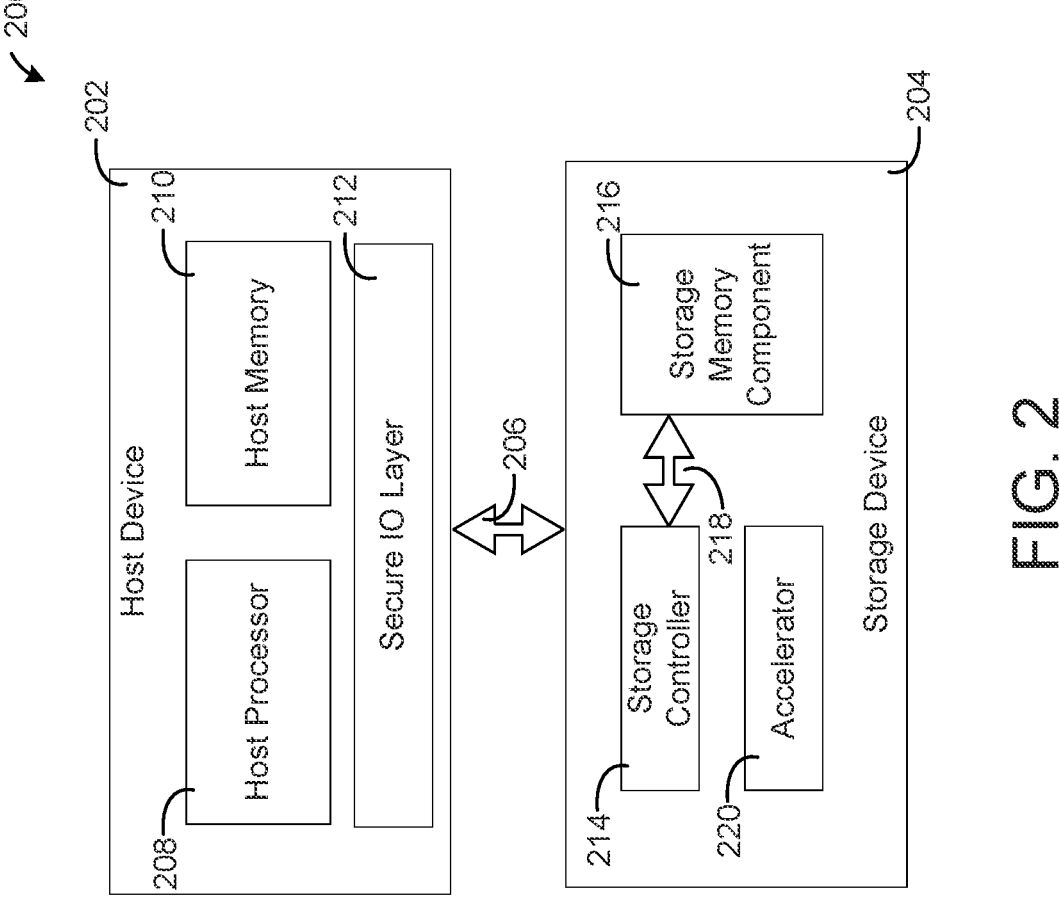
FIG. 2 illustrates a host device and a storage device included in a storage system, according to one or more embodiments of the present disclosure.

The source storage device 104 may retrieve the requested data (e.g., from its storage memory component 216 as shown in FIG. 2) in encrypted format, and in response to the indicator of the decryption override, may transmit the requested data in the encrypted format as-is to the destination storage device 108 over a suitable transport layer (e.g., a suitable transfer medium) without first decrypting the requested data. For example, in some embodiments, as shown in FIG. 1, the transport layer may include the source and destination host devices 102 and 106. In this case, the source storage device 104 may transmit the requested data in the encrypted format to the source host device 102, and the source host device 102 may transmit the requested data in the encrypted format to the destination host device 106.

The destination host device 106 may then transmit a WRITE request of the requested data in the encrypted format to the destination storage device 108 with an option to not encrypt the requested data. For example, the destination host device 106 may transmit a WRITE command for the requested data to the destination storage device 108 along with an indicator (e.g., a bit, a flag, a signal, a plug-in, a separate command, and/or the like) to override (e.g., to skip) encryption of the requested data. In various embodiments, the indicator may be part of the WRITE command, for example, as a modified WRITE command, may be received at a dedicated port or channel of the destination storage device 108 to indicate the encryption override, may be received as a separate command or signal from the WRITE command, and/or the like, so long as the destination storage device 108 may distinguish the encryption override indicator from other WRITE commands (e.g., an encrypt and WRITE command). The destination storage device 108 may receive the requested data as-is in the encrypted format from the destination host device 106, and in response to the indicator of the encryption override, may store the requested data as-is in the encrypted format (e.g., in its storage memory component 216 as shown in FIG. 2) without re-encrypting the requested data.

However, the present disclosure is not limited thereto, and in other embodiments, the source storage device 104 and the destination storage device 108 may directly communicate with each other over any suitable transport layer, for example, such as over a secure communications channel or lane (e.g., a network card, Peripheral Component Interconnect Express (PCIe), and/or the like, or any suitable combinations thereof, for example, such as Peer to Peer (P2P), and/or the like), such that the source storage device 104 may directly transmit the requested data in the encrypted format to the destination storage device 108 without using the source host device 102 and/or the destination host device 106. In other examples, the source storage device 104 and the destination storage device 108 may directly or indirectly communicate with each other, with or without the involvement of another device, using any suitable direct or indirect communications mechanism. For example, if a host bus adapter provides a communications channel between two storage devices connected thereto, the two storage devices may communicate with each other over the provided communications channel of the host bus adapter without involvement of another device. Accordingly, the transport layer may include any suitable communications mechanism between the source storage device 104 and the destination storage device 108 to enable the source storage device 104 to transmit the data as-is in the encrypted format to the destination storage device 108.

The source storage device 104 may also transfer an encryption/decryption key to the destination storage device 108, such that the destination storage device 108 may use the key to decrypt the requested data as needed or desired. For example, the source storage device 104 may transfer the key to at least one of the host device 102, a key server 110, or the destination storage device 108. In some embodiments, the transferring of the key may be performed using asymmetric encryption, which allows for the key to be encrypted by the sender and decrypted by the receiver. For example, as would be appreciated by those having ordinary skill in the art, the key may be transferred securely (e.g., with reduced possibility of interception) via an asymmetric encryption channel, and in the event that the key is intercepted, the key may be in an unusable format (e.g., the key may be in an encrypted format). The transferring of the key from the source storage device 104 to the destination storage device 108 is not particularly limited, so long as the destination storage device 108 may securely retrieve the key (e.g., through push or pull) as needed or desired in order to decrypt the requested data.

For example, as shown in FIG. 1, in some embodiments, each of the source host device 102 and the destination host device 106 may be communicably connected to the key server 110 that manages the keys used by the source storage device 104 and the destination storage device 108, but the present disclosure is not limited thereto. When the key server 110 is used to manage the keys, the source storage device 104 may transfer the key to the source host device 102, and the source host device 102 may communicate with the key server 110 to transfer the key associated with the requested data to the destination storage device 108 (e.g., via the destination host device 106). In another embodiment, the source storage device 104 may directly transfer the key to the key server 110, without first transmitting the key to the source host device 102.

As another example, in some embodiments, the key server 110 may be omitted. For example, in an embodiment, each of the source storage device 104 and the destination storage device 108 may be connected to the same host (e.g., 102 or 106). In this case, the host may manage the keys used by the source storage device 104 and the destination storage device 108, such that the host may serve as the key server 110. In another embodiment, the source host device 102 may directly transfer the key to the destination host device 106 (e.g., over a secure IO layer 212 as shown in FIG. 2), and thus, the key server 110 may not be used. In another embodiment, the source storage device 104 may directly transfer the key to the destination storage device 108, for example, without using the source host device 102, the key server 110, and/or the destination host device 106.

In some embodiments, the transferring of the key to the destination storage device 108 may be pushed to the destination storage device 108 (e.g., immediately after the requested data is transmitted to the destination storage device 108), or may be pulled by the destination storage device 108 as needed or desired (e.g., when decrypting the requested content in response to a READ request). For example, in the latter case, when the destination storage device 108 receives a READ command (e.g., from the destination host device 106) for the requested data stored therein in encrypted format, the destination storage device 108 may request the key from the destination host device 106 (which may already have the key or which may further request the key from the key server 110 or the source host device 102), from the key server 110 (e.g., directly or through the destination host device 106), or from the source storage device 104 (e.g., directly or through the source and destination host devices 102 and 106).

In various embodiments, the transferring of the key may include transferring of the key ownership or information indicative of the key ownership to the destination storage device 108, such that the requested data stored in the source storage device 104 is rendered useless (e.g., instant secure erase). This case may be useful, for example, in situations where the requested data is transferred or moved from the source storage device 104 to the destination storage device 108, for example, such as during a virtual machine (VM) migration where VM disk files are transferred from one storage device to another storage device.

In some embodiments, the transferring of the key may include using asymmetric key exchange (e.g., public key/private key), for example, such that the source storage device 104, the source host device 102, or the key server 110 may retain ownership of a private key while the destination storage device 108 is allocated a public key to decrypt the encrypted data stored therein as needed or desired. This case may be useful, for example, in direct transfer scenarios to ensure the security of the key in flight.

In some embodiments, the source storage device 104, the source host device 102, or the key server 110 may retain ownership of the key, and the destination storage device 108 may not be provided a key to decrypt the requested data. For example, because the requested data may be stored in the destination storage device 108 as-is in the encrypted format received from the source storage device 104, the source storage device 104 may later retrieve (e.g., may request) the requested data from the destination storage device 108 as-is in the encrypted format without first being decrypted by the destination storage device 108. This case may be useful, for example, in situations where the source storage device 104 retains the requested data, and provides a copy of the requested data to the destination storage device 108, for example, as a snapshot (e.g., a volume snapshot), a backup (e.g., a disk backup, volume backup, and/or the like), an archive, and/or the like.

FIG. 2 illustrates a host device and a storage device included in a storage system, according to one or more embodiments of the present disclosure. FIG. 2 shows a simplified example of a storage system 200 in which one host device 202 is connected to one storage device 204, but the present disclosure is not limited thereto, and the storage system 200 may include any suitable number of host devices that are each connected to any suitable number of storage devices. Further, as described above, the storage system 200 may include a plurality of storage devices (e.g., the source storage device 104 and the destination storage device 108 shown in FIG. 1) that may be connected to the same host device (e.g., the host device 202) or different host devices (e.g., the source host device 102 and the destination host device 106). For example, at least one of the source host device 102 and/or the destination host device 106 shown in FIG. 1 may have a configuration and structure that is the same or substantially the same as (or similar to) those of the host device 202 shown in FIG. 2. Similarly, at least one of the source storage device 104 and/or the destination storage device 108 shown in FIG. 1 may have a configuration and structure that is the same or substantially the same as (or similar to) those of the storage device 204 shown in FIG. 2.

Referring to FIG. 2, the host device 202 may be connected to the storage device 204 over a host interface 206. The host device 202 may issue data access commands (e.g., READ/WRITE commands) to the storage device 204 over the host interface 206, and may receive the requested data from the storage device 204 over the host interface 206.

The host device 202 may include a host processor 208, host memory 210, and a secure input/output (IO) layer 212. The host processor 208 may be a general purpose processor, for example, such as a central processing unit (CPU) core of the host device 202. The host processor 208 may be connected to other components via an address bus, a control bus, a data bus, and/or the like. The host memory 210 may be considered as high performing main memory (e.g., primary memory) of the host device 202. For example, in some embodiments, the host memory 210 may include (or may be) volatile memory, for example, such as dynamic random-access memory (DRAM). However, the present disclosure is not limited thereto, and the host memory 210 may include (or may be) any suitable high performing main memory (e.g., primary memory) replacement for the host device 202 as would be known to those skilled in the art. For example, in other embodiments, the host memory 210 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

The secure IO layer 212 may be used to securely transfer data and/or information between the host device 202 and the storage device 204, and/or between the host device 202 and another host device (e.g., between the source host device 102 and the destination host device 106 shown in FIG. 1). For example, the secure IO layer 212 may include application programming interfaces (APIs), driver integrated circuits (IC), and/or other supporting firmware/software, as would be understood to those having ordinary skill in the art, to enable secure communications between two or more devices, for example, such as between the source storage device 104 and the destination storage device 108, between a host device and a storage device, between a storage device and a network card, and/or the like. However, the secure IO layer 212 is not particularly limited to the embodiment shown in FIG. 2, so long as secure communications between two or more devices are enabled to transmit the requested data and/or the key securely between the two or more devices. While the secure IO layer 212 is shown as being part of the host device 202, the present disclosure is not limited thereto, and the secure IO layer 212 may be implemented as part of any suitable device (e.g., as part of the storage device 204) to enable secure communications between the two or more devices.

The storage device 204 may be considered as secondary memory that may persistently store data accessible by the host device 202. In this context, the storage device 204 may include (or may be) relatively slower memory when compared to the high performing memory of the host memory 210. For example, in some embodiments, the storage device 204 may be secondary memory of the host device 202, for example, such as a Solid-State Drive (SSD). However, the present disclosure is not limited thereto, and in other embodiments, the storage device 204 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like, and may include (or may be) relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like. In various embodiments, the storage device 204 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 204 may conform to any suitable or desired derivative of these form factors. For convenience, the storage device 204 may be described hereinafter in the context of an SSD, but the present disclosure is not limited thereto.

The storage device 204 may be communicably connected to the host device 202 over the host interface 206. The host interface 206 may facilitate communications (e.g., using a connector and a protocol) between the host device 202 and the storage device 204. In some embodiments, the host interface 206 may facilitate the exchange of storage requests and responses between the host device 202 and the storage device 204. In some embodiments, the host interface 206 may facilitate data transfers by the storage device 204 to and from the host memory 210 of the host device 202. For example, in various embodiments, the host interface 206

(e.g., the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the host interface 206 (e.g., the connector and the protocol thereof) may include (or may conform to) various general-purpose interfaces, for example, such as Ethernet, Universal Serial Bus (USB), and/or the like.

In some embodiments, the storage device 204 may include a storage controller 214, a storage memory component 216, and a storage interface 218. The storage controller 214 may be connected to the storage memory component 216 over the storage interface 218. In the context of the SSD, the storage interface 218 may be referred to as a flash interface layer, and may be an interface with which the storage memory component 216 (e.g., NAND flash memory) may communicate with a processor or other device (e.g., the storage controller 214). Commands such as reset, write enable, control signals, clock signals, and/or the like may be transmitted over the storage interface 218. Further, a software interface may be used in combination with a hardware element that may be used to test/verify the working of the storage interface 218. The software may be used to read and write data to the storage memory component 216 via the storage interface 218. Further, the software may include firmware that may be downloaded onto the hardware elements (e.g., for controlling erase, write, and read operations).

The storage controller 214 may be connected to the host interface 206, and may manage signaling over the host interface 206. In some embodiments, the storage controller 214 may include an associated software layer to manage the physical connector of the host interface 206. The storage controller 214 may respond to input/output (I/O) requests received from the host device 202 over the host interface 206. The storage controller 214 may also manage the storage interface 218 to control, and to provide access to and from, the storage memory component 216. For example, the storage controller 214 may include at least one processing circuit embedded thereon for interfacing with the host device 202 and the storage memory component 216. The processing circuit may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory component 216 according to the data access instructions. For example, the data access instructions may include any suitable data storage and retrieval algorithm (e.g., READ/WRITE) instructions, and/or the like. The storage memory component 216 may persistently store the data received from the host device 202. In an embodiment, the storage memory component 216 may include non-volatile memory, for example, such as NAND flash memory. However, the present disclosure is not limited thereto, and the storage memory component 216 may include any suitable memory depending on a type of the storage device 204 (e.g., magnetic disks, tape, optical disks, and/or the like).

In some embodiments, the storage device 204 may further include an accelerator 220. The accelerator 220 may enhance input/output operations of the storage controller 214 to increase the efficiency of the storage device 204. For example, in some embodiments, the accelerator 220 may include the encryption/decryption element (e.g., the AES Engine shown in FIG. 1) to facilitate in the encryption/decryption of the requested data. However, the present disclosure is not limited thereto, and in some embodiments, the accelerator 220 may be omitted as needed or desired. In this case, the storage controller 214 (or another processing circuit or computing element included in the storage device 204) may include the encryption/decryption element to encrypt/decrypt the requested data as needed or desired.

According to one or more embodiments of the present disclosure, the storage controller 214 may receive read/write commands from the host device 202 over the host interface 206, as well as the encryption/decryption override indicator, and the storage controller 214 and/or the accelerator 220 may forgo (e.g., may override, skip, and the like) encryption/decryption of the requested data stored/to be stored in the storage memory component 216 in response to the encryption/decryption override indicator.

Figure 3:
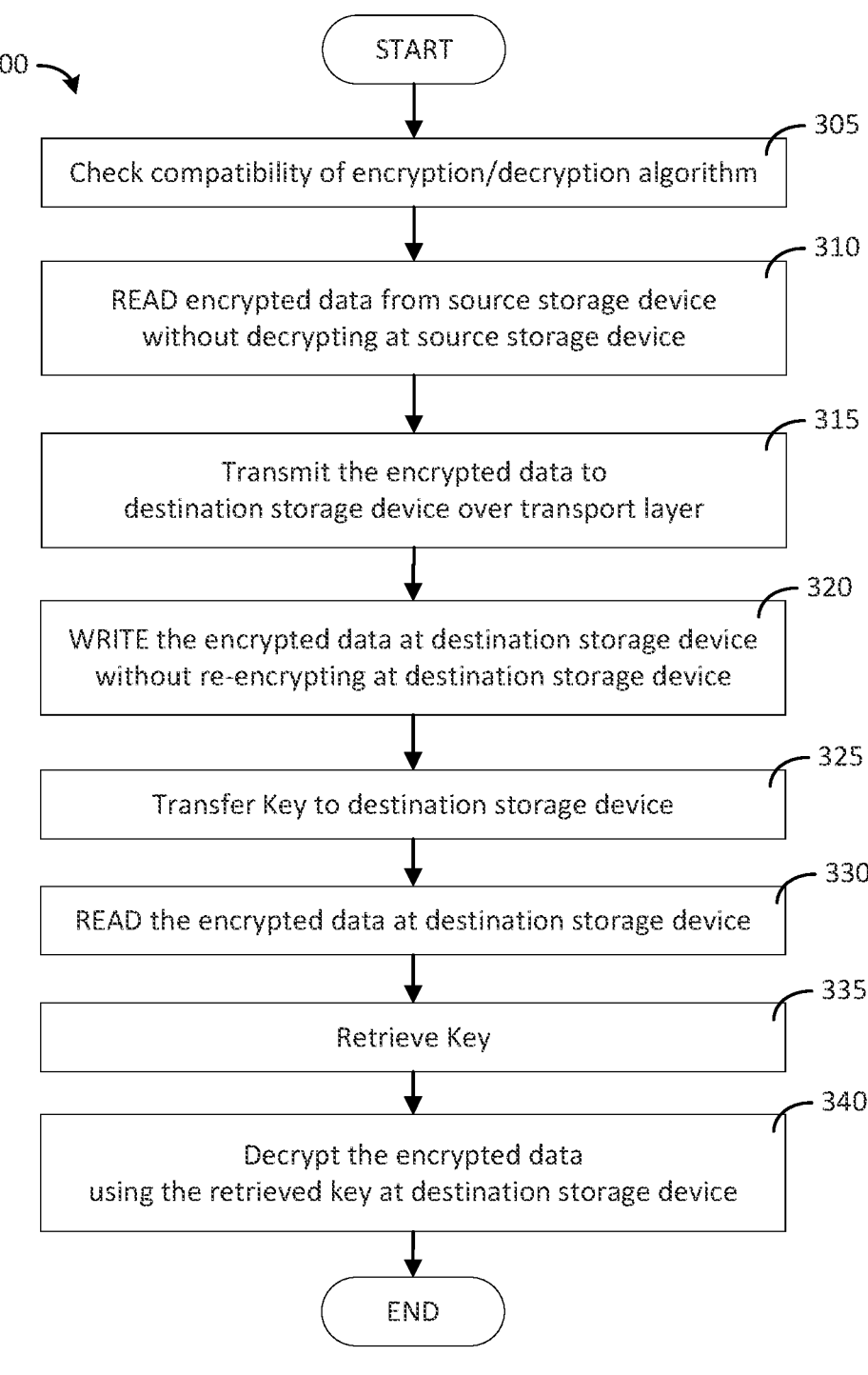
FIG. 3 illustrates a flow chart of a method of securely transmitting data between storage devices, according to one or more embodiments of the present disclosure.

FIG. 3 illustrates a flow chart of a method 300 of securely transmitting data between storage devices, according to one or more embodiments of the present disclosure.

However, the present disclosure is not limited to the sequence or number of the operations of the method 300 shown in FIG. 3, and can be altered into any desired sequence or number of operations as recognized by a person having ordinary skill in the art. For example, in some embodiments, the order may vary, or the method 300 may include fewer or additional operations. Further, the operations shown in the method 300 may be performed by any suitable one of the components and elements or any suitable combination of the components and elements of those of one or more example embodiments described above.

Referring to FIGS. 1 through 3, the method 300 starts, and compatibility of the encryption/decryption algorithm between the source storage device 104 and the destination storage device 108 is checked at block 305. For example, because the requested data may be transmitted in the encrypted format as-is by the source storage device 104, the destination storage device 106 may use a compatible encryption/decryption algorithm as that of the source storage device 104 in order to decrypt the requested data as needed or desired.

In some embodiments, the source host device 102 may verify whether the encryption/decryption algorithm used by the source storage device 104 is compatible with that used by the destination storage device 106. For example, in some embodiments, the source host device 102 may communicate with the destination host device 106 or the key server 110 according to a configuration thereof, to determine whether the encryption/decryption algorithms used by the source and destination storage devices 104 and 108 are compatible with each other. In another embodiment, the source storage device 104 (e.g., the storage controller 214 and/or the accelerator 220 thereof) may verify whether the encryption/decryption algorithm used by the destination storage device 106 is compatible with that used by the source storage device 104.

In some embodiments, if the encryption/decryption algorithm used by the source storage device 104 is incompatible with that used by the destination storage device 108, the method 300 may end, and the requested data may be first decrypted by the source storage device 104 before being sent to the destination storage device 108 in an unsecure format (e.g., in plain text), and the destination storage device 108 may re-encrypt the requested data prior to storing the requested data therein. However, the present disclosure is not limited thereto. For example, in another embodiment, if the source storage device 104 and the destination storage device 108 exchange encryption/decryption algorithm information with each other, the requested data may still be transmitted to the destination storage device 108 in the encrypted format, and the source storage device 108 may provide the encryption/decryption algorithm information to the destination storage device 108 for decrypting the requested data as needed or desired. Such a case may be useful, for example, when the source storage device 104 and the destination storage device 108 are produced by different manufacturers. As another example, in some embodiments, if the destination storage device 108 does not have decryption capabilities or uses a different decryption algorithm from that of the source storage device 104, but another device (e.g., the destination host device 106) that is communicably connected to the destination storage device 108 has the decryption capabilities (or uses compatible decryption algorithms), then the requested data may still be transmitted to the destination storage device 108 in the encrypted format to be stored by the destination storage device 108 in the encrypted format, and may be decrypted as needed or desired by the other device that is communicably connected to the destination storage device 108.

In some embodiments, the requested data, which may be stored in the source storage device 104 as encrypted data, may be read from the source storage device 104 as-is without decrypting the requested data by the source storage device 104 at block 310. For example, as discussed in more detail below with reference to FIG. 4, in response to determining that the encryption/decryption algorithms of the source and destination storage devices 104 and 108 are compatible (e.g., at block 305) with each other, the source host device 202 may transmit a READ command to the source storage device 104 with an indicator to override decryption of the requested data. In this case, the source storage device 104 (e.g., the storage controller 214) may read the requested data in encrypted format from its storage memory component 216, and may skip the decryption of the requested data in response to the decryption override indicator.

In some embodiments, the requested data, which is still in encrypted format as encrypted data, is transmitted to the destination storage device 108 over the suitable transport layer at block 315. For example, in some embodiments, the encrypted data may be transmitted from the source storage device 104 to the destination storage device 108 through the source and destination host devices 102 and 106 as described above. In another embodiment, the encrypted data may be directly transmitted from the source storage device 104 to the destination storage device 108 over the secure communications channel or lane between the source storage device 104 and the destination storage device 108 as described above.

In some embodiments, the requested data, which is received as the encrypted data, is written to the destination storage device 108 as-is as the encrypted data, without re-encrypting the requested data at the destination storage device 108 at block 320. For example, as discussed in more detail below with reference to FIG. 5, in response to receiving a WRITE command from the destination host device 106 with an indicator to override encryption of the requested data, the destination storage device 108 may store the requested data in the received encrypted format in its storage memory component 216, while skipping the encryption of the requested data in response to the encryption override indicator.

In some embodiments, the key is transferred to the destination storage device 108 at block 325. As discussed above, the key may be pushed to the destination storage device 108 (e.g., directly or via the destination host device 106 and/or the key server 110), or may be pulled (e.g., on demand) by the destination storage device 108 (e.g., directly or via the destination host device 106) as needed or desired, from at least one of the source storage device 104, the source host device 102, or the key server 110. For example, the destination storage device 108 may use the key to decrypt the requested content as needed or desired, which is stored in the destination storage device 108 as the received encrypted data that was encrypted by the source storage device 104.

In some embodiments, the requested data, which is stored as encrypted data, is READ at the destination storage device 108 at block 330. For example, in some embodiments, the destination host device 106 may subsequently transmit a READ command to the destination storage device 108 to READ the requested data from the storage memory component 216 of the destination storage device 108. In this case, as discussed in more detail below with reference to FIG. 4, the decrypt override indicator may not be provided, such that the destination storage device 108 may first decrypt the requested content prior to providing the requested content to the destination host device 106.

Accordingly, in some embodiments, the key may be retrieved at block 335. As discussed above, in some embodiments, the key may be retrieved on demand (e.g., pulled) from the destination storage device 108 as needed or desired from at least one of the source host device 102, the source storage device 104, or the key server 110 (e.g., directly or using the destination host device 106). In some embodiments, the key may be pushed to the destination storage device 108 (e.g., immediately after the requested data is transmitted to the destination storage device 108). In this case, the destination storage device 108 may retrieve the key from the destination host device 106, from internal memory, or from any suitable key store storing the key.

In some embodiments, the requested data, which is stored in the destination storage device 108 as the received encrypted data, may be decrypted at the destination storage device 108 using the retrieved key at block 340. For example, as discussed above, the destination storage device 108 (e.g., the storage controller 214 and/or the accelerator 220 thereof) may decrypt the requested data, which is stored as encrypted data encrypted by the source storage device 103, using the retrieved key. After decrypting the requested data, the decrypted data may be transmitted to the requesting device (e.g., the destination host device 106), and the method 300 may end.

Figure 4:
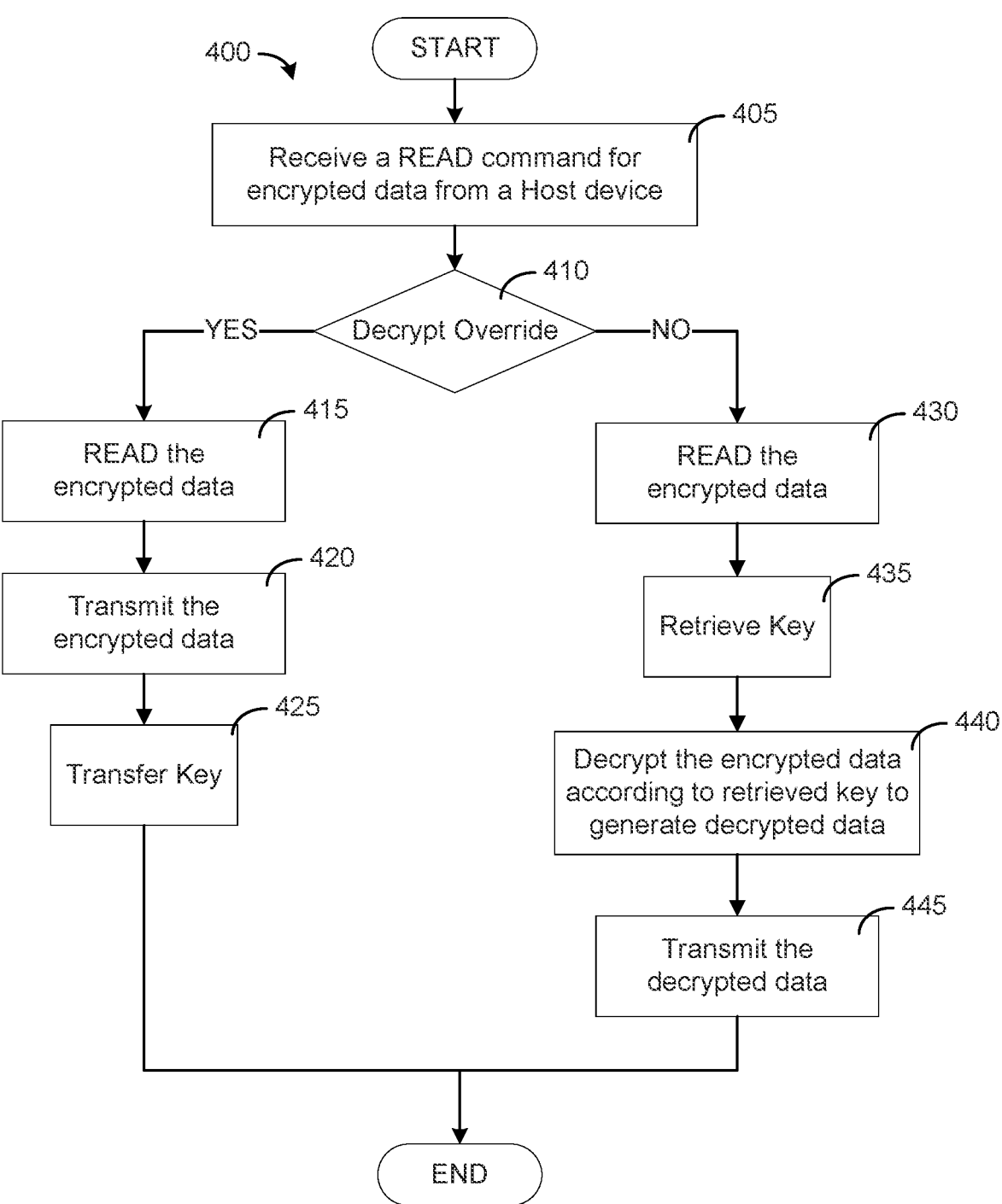
FIG. 4 illustrates a flow chart of various processes of a method of reading data for secure transmission between storage devices, according to one or more embodiments of the present disclosure.

FIG. 4 illustrates a flow chart of various processes of a method 400 of reading data for secure transmission between storage devices, according to one or more embodiments of the present disclosure. For example, the method 400 may be performed by the storage device 204 shown in FIG. 2, which may correspond to at least one of the source storage device 104 and/or the destination storage device 108 shown in FIG. 1.

However, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method 400 may include fewer or additional operations. Further, the operations shown in the method 400 may be performed by any suitable one of the components and elements or any suitable combination of the components and elements of those of one or more example embodiments described above.

Referring to FIGS. 1 to 4, the method 400 may start, and a READ command for encrypted data may be received from a host device at block 405. For example, in some embodiments, the READ command may be received by the source storage device 104 from the source host device 102 in block 310 of the method 300 of FIG. 3, or the READ command may be received by the destination storage device 108 from the destination host device 106 in block 330 of the method 300 of FIG. 3. Thus, depending on the case, the decrypt override indicator may or may not be received from the host device.

Accordingly, the storage device may determine whether the decrypt override indicator is received at block 410. The decrypt override indicator may be received (e.g., YES at block 410), for example, at block 310 of the method 300 of FIG. 3, in response to the determining that the source storage device 104 and the destination storage device 108 use compatible encryption decryption algorithms with each other at block 305. When the decrypt override indicator is received (e.g., YES at block 410), the storage device may READ the encrypted data at block 415, for example, from its storage memory component 204, and may transmit the encrypted data as-is at block 420, without first decrypting the encrypted data. The transmitting of the encrypted data at block 420 in FIG. 4 may correspond to the transmitting of the encrypted data to the destination storage device over the suitable transport layer in block 315 of the method 300 of FIG. 3. Thus, at block 420, the storage device may transmit the encrypted data to the host device for transmitting to the destination storage device 108 via the destination host device 106, or may transmit the encrypted data directly to the destination storage device 108, for example, over the secure communications channel or lane therebetween.

In some embodiments, the storage device may further transfer the key at block 425 and the method 400 may end. For example, the transferring of the key at block 425 may correspond to the transferring of the key to the destination storage device at block 325 in the method 300 of FIG. 3. Thus, the storage device may transfer the key to at least one of the source host device 102, the destination storage device 108, or the key server 110 on demand (e.g., pull), for example, when the destination storage device requests the key, or may push the key to at least one of the source host device 102, the destination storage device 108, or the key server 110 (e.g., immediately after the encrypted data is transmitted).

As described above, the transferring of the key may include transferring of the key ownership or information indicative of the key ownership to the destination storage device 108, such that the requested data stored in the source storage device 104 is rendered useless (e.g., instant secure erase). In some embodiments, the transferring of the key may include using asymmetric key exchange (e.g., public key/private key), for example, such that the source storage device 104, the source host device 102, or the key server 110 may retain ownership of a private key while the destination storage device 108 is allocated a public key. However, the present disclosure is not limited thereto, and as discussed above, in some embodiments, the source storage device 104, the source host device 102, or the key server 110 may retain ownership of the key, and the destination storage device 108 may not be provided a key to decrypt the requested data, for example, such as in scenarios of a snapshot (e.g., a volume snapshot), a backup (e.g., a disk backup, volume backup, and/or the like), an archive, and/or the like.

On the other hand, when the decrypt override indicator is not received (e.g., NO at block 410), the storage device may READ the encrypted data at block 430, for example, from its storage memory component 204, and may retrieve the key at block 435 to decrypt the encrypted data (e.g., by the storage controller 214 and/or the accelerator 220) according to the retrieved key to generate decrypted data at block 440. In some embodiments, the decrypt override indicator may not be received (e.g., NO at block 410), for example, at block 310 of the method 300 of FIG. 3, in response to the determining that the source storage device 104 and the destination storage device 108 use incompatible encryption decryption algorithms from each other at block 305. In this case, the source storage device 104 may retrieve the key at block 435 from the source host device 102, from internal memory, or from any suitable key store storing the key, may decrypt the encrypted data using the retrieved key at block 440, may transmit the decrypted data to the source host device 102 at block 445, and the method 400 may end.

In some embodiments, the decrypt override indicator may not be received (e.g., NO at block 410), for example, at block 330 of the method 300 of FIG. 3, for example, when the destination host device 106 transmits a READ command to the destination storage device 108 without the decrypt override indicator. In this case, the destination storage device 108 may retrieve the key at block 435 by pulling the key (e.g., directly or using the destination host device 106) from at least one of the source storage device 104, the source host device 102, and/or the key server 110, or when the key has already been pushed, the destination storage device 108 may retrieve the key from the destination host device 106, from internal memory, or from any suitable key store storing the key. The destination storage device 108 may decrypt the encrypted data using the retrieved key at block 440, may transmit the decrypted data to the requesting device (e.g., the destination host device 106) at block 445, and the method 400 may end.

Figure 5:
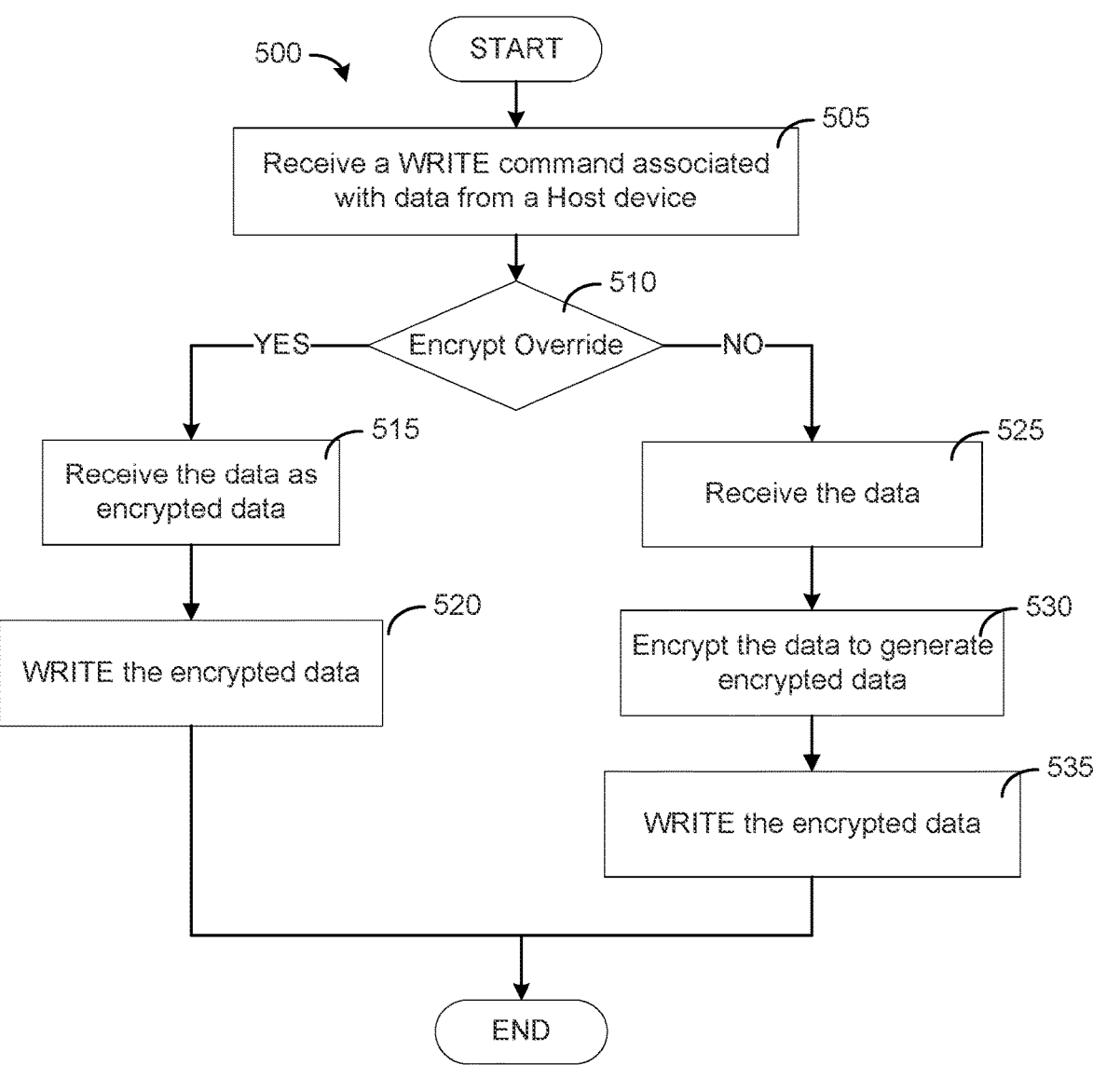
FIG. 5 illustrates a flow chart of various processes of a method of writing data for secure transmission between storage devices, according to one or more embodiments of the present disclosure.

FIG. 5 illustrates a flow chart of various processes of a method 500 of writing data for secure transmission between storage devices, according to one or more embodiments of the present disclosure. For example, the method 500 may be performed by the storage device 204 shown in FIG. 2, which may correspond to at least one of the source storage device 104 and/or the destination storage device 108 shown in FIG. 1.

However, the present disclosure is not limited to the sequence or number of the operations of the method 500 shown in FIG. 5, and can be altered into any desired sequence or number of operations as recognized by a person having ordinary skill in the art. For example, in some embodiments, the order may vary, or the method 500 may include fewer or additional operations. Further, the operations shown in the method 500 may be performed by any suitable one of the components and elements or any suitable combination of the components and elements of those of one or more example embodiments described above.

Referring to FIGS. 1 to 3 and 5, the method 500 may start, and a WRITE command for data may be received from a host device at block 505. For example, in some embodiments, the WRITE command may be received by the destination storage device 108 from the destination host device 106 for data received in encrypted format in block 320 of the method 300 of FIG. 3, or the WRITE command may be received by the destination storage device 108 from the destination host device 106 for data received in unsecure format (e.g., plain text data), for example, when the encryption/decryption algorithms of the source and destination storage devices 104 and 108 are incompatible with each other at block 305 of the method 300 of FIG. 3. Thus, depending on the case, the encryption override indicator may or may not be received from the host device.

Accordingly, the storage device may determine whether the encrypt override indicator is received at block 510. The encrypt override indicator may be received (e.g., YES at block 510), for example, at block 320 of the method 300 of FIG. 3 when the requested data is received by the destination host device 106 in the encrypted format. When the encrypt override indicator is received (e.g., YES at block 510), the storage device may receive the data in the encrypted format as encrypted data at block 515, and may write the encrypted data as-is in its storage memory component 216 at block 520, without first re-encrypting the encrypted data, and the method 500 may end.

On the other hand, when the encrypt override indicator is not received (e.g., NO at block 510), the storage device may receive the data as unsecure data (e.g., plain text data) at block 525, may encrypt the data to generate encrypted data at block 530, may WRITE the encrypted data into its storage memory component 216 at block 535, and the method 500 may end. In some embodiments, the encrypt override indicator may not be received (e.g., NO at block 510), for example, in response to determining that the encryption/decryption algorithms used by the source and destination storage devices 104 and 108 are incompatible with each other at block 305 of the method 300 of FIG. 3. In this case, the source storage device 104 may first decrypt the requested data before being transmitted to the destination storage device 108, and the destination storage device 108 may first re-encrypt the received decrypted data prior to storing therein.

According to one or more embodiments of the present disclosure, requested data may be transmitted between storage devices in encrypted format, and thus, the requested data may be relatively secure during the transmitting between the storage devices. Further, according to one or more embodiments of the present disclosure, the requested data may not be unnecessary decrypted prior to being transmitted by a source storage device, and re-encrypted prior to being stored by a destination storage device. Accordingly, throughput may be increased and/or latency and power consumption may be decreased.

While various methods according to one or more embodiments of the present disclosure has been described according to various processes having a certain process order, the present disclosure is not limited thereto. For example, when a certain embodiment may be implemented differently, a specific process order may be different from the described order. For example, two consecutively described processes may be performed at the same or substantially at the same time, may be performed in an order opposite to the described order, or may be performed in an order that does not follow the sequential progression presented in the present disclosure.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
a storage memory component configured to store requested data in encrypted format; and
a storage controller connected to the storage memory component, the storage controller configured to:
 receive a command and a decryption override indicator from a host device over a host interface to read the requested data from the storage memory component;
 retrieve the requested data from the storage memory component in the encrypted format based on the command;
 transmit the requested data in the encrypted format to a destination storage device over a direct communication channel and based on the decryption override indicator, wherein the destination storage device comprises a local connection to the storage device for data migration via the direct communication channel; and
 transfer a key associated with the requested data for decrypting the requested data from the encrypted format, the transfer of the key from the storage device to the destination storage device over the direct communication channel and based on a request for the key from the destination storage device and a determination that an encryption/decryption algorithm of the destination storage device is compatible with encryption/decryption algorithm of the storage device.

2. The storage device of claim 1, wherein the direct communication channel comprises a secure communications channel between the storage device and the destination storage device, and
 wherein to transmit the requested data in the encrypted format to the destination storage device, the storage controller is configured to transmit the requested data in the encrypted format to the destination storage device through the secure communications channel.

3. The storage device of claim 1, wherein to transfer the key, the storage device is configured to transfer the key associated with the requested data to the destination storage device and the host device.

4. The storage device of claim 3, wherein to transfer the key, the storage device is configured to transfer an ownership of the key or information indicative of the ownership of the key.

5. The storage device of claim 3, wherein to transfer the key, the storage device is configured to retain a private key associated with the requested data, and to transfer a public key associated with the requested data.

6. The storage device of claim 3, wherein to transfer the key, the storage device is configured to transfer the key to the destination storage device and a key server communicably connected to the host device.

7. The storage device of claim 3, wherein the storage controller is configured to transfer the key based on a request for the key.

8. The storage device of claim 1, wherein the storage device comprises a solid state drive, the storage memory component comprises flash memory, and a storage interface comprises a flash interface layer of the storage device.

9. A storage system comprising:
a first storage device configured to:
 store requested data in an encrypted format;
 transmit the requested data in the encrypted format over a direct communication channel to a second storage device based on a read command and a first indicator, wherein the first storage device comprises a local connection to the second storage device for data migration via the direct communication channel; and
 transfer, over the direct communication channel, a key associated with the requested data for decrypting the requested data from the encrypted format from the first storage device to the second storage device based on a request for the key from the second storage device and a determination that an encryption/decryption algorithm of the second storage device is compatible with encryption/decryption algorithm of the first storage device; and
the second storage device connected to the first storage device through the direct communication channel, the second storage device being configured to:
 receive the requested data in the encrypted format over the direct communication channel; and
 store the requested data in the encrypted format based on a write command and a second indicator.

10. The storage system of claim 9, wherein the first storage device comprises:
a first storage memory component configured to store the requested data in the encrypted format; and
a first storage controller connected to the first storage memory component over a first storage interface, the first storage controller configured to:
 receive the read command and the first indicator to read the requested data from the first storage memory component;

retrieve the requested data from the first storage memory component in the encrypted format based on the read command; and transmit the requested data in the encrypted format to the second storage device over the direct communication channel based on the first indicator.

11. The storage system of claim 10, wherein to transfer the key, the first storage device is configured to push the transfer of the key to the second storage device based on transmitting the requested data.

12. The storage system of claim 11, wherein to transfer the key, the first storage device is configured to transfer an ownership of the key or information indicative of the ownership of the key.

13. The storage system of claim 11, wherein to transfer the key, the first storage device is configured to retain a private key associated with the requested data, and to transfer a public key associated with the requested data.

14. The storage system of claim 11, further comprising a key server communicably connected to the first and second storage devices, wherein to transfer the key, the first storage device is configured to transfer the key to the key server.

15. The storage system of claim 11, wherein the second storage device comprises:

a second storage memory component; and a second storage controller connected to the second storage memory component over a second storage interface, the second storage controller configured to:

receive the write command and the second indicator to write the requested data in the encrypted format to the second storage memory component;

skip encryption of the requested data based on the second indicator; and store the requested data in the encrypted format in the second storage memory component.

16. The storage system of claim 15, wherein the second storage device is further configured to:

receive a third command to read the requested data from the second storage memory component;

retrieve the requested data in the encrypted format from the second storage memory component;

retrieve the key; and decrypt the requested data according to the key.

17. The storage system of claim 15, wherein:

at least one of the first storage device or the second storage device comprises a solid state drive;

at least one of the first storage memory component or the second storage memory component comprises flash memory; and at least one of the first storage interface or the second storage interface comprises a flash interface layer.

18. A method of securely transmitting data between storage devices, the method comprising:

determining that an encryption method configured for a first storage device is operable or inoperable with an encryption method configured for a second storage device;

based on the determining that the encryption method configured for the first storage device is operable with the encryption method configured for the second storage device:

reading requested data in encrypted format at the first storage device;

transmitting the requested data in the encrypted format from the first storage device over a direct communication channel to the second storage device, wherein the first storage device comprises a local connection to the second storage device for data migration via the direct communication channel;

writing the requested data in the encrypted format at the second storage device by skipping encryption of the requested data;

transferring, over the direct communication channel, from the first storage device a key associated with the requested data for decrypting the requested data to the second storage device based on a request for the key from the second storage device;

reading the requested data at the second storage device;

retrieving the key associated with the requested data; and decrypting the requested data using the key at the second storage device.

19. The method of claim 18, further comprising:

based on the determining that the encryption method configured for the first storage device is inoperable with the encryption method configured for the second storage device:

transmitting the requested data in the encrypted format along with decryption information from the first storage device to the second storage device.

* * * * *